US012338955B2

(12) United States Patent
Umeda et al.

(10) Patent No.: US 12,338,955 B2
(45) Date of Patent: Jun. 24, 2025

(54) TRIPLE CONTAINMENT TANK

(71) Applicant: KAWASAKI JUKOGYO KABUSHIKI KAISHA, Kobe (JP)

(72) Inventors: Akira Umeda, Kobe (JP); Takeshi Egami, Kobe (JP); Takahiro Yamaguchi, Kobe (JP); Takahiro Sato, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 28 days.

(21) Appl. No.: 18/269,645

(22) PCT Filed: Dec. 21, 2021

(86) PCT No.: PCT/JP2021/047383
§ 371 (c)(1),
(2) Date: Jun. 26, 2023

(87) PCT Pub. No.: WO2022/145296
PCT Pub. Date: Jul. 7, 2022

(65) Prior Publication Data

US 2024/0060604 A1 Feb. 22, 2024

(30) Foreign Application Priority Data

Dec. 28, 2020 (JP) ................................ 2020-218833

(51) Int. Cl.
*F17C 13/08* (2006.01)

(52) U.S. Cl.
CPC ...... *F17C 13/08* (2013.01); *F17C 2203/0341* (2013.01); *F17C 2203/035* (2013.01);
(Continued)

(58) Field of Classification Search
CPC .... F17C 3/08; F17C 3/022; F17C 2203/0631; F17C 13/08; F17C 13/081; F17C 13/086;
(Continued)

(56) References Cited

U.S. PATENT DOCUMENTS 2,460,355 A * 2/1942 Kornemann .......... F17C 13/081
62/DIG. 13
3,768,765 A * 10/1973 Breckenridge, Jr. . F17C 13/086
248/901

(Continued)

FOREIGN PATENT DOCUMENTS

JP S55-20937 A 2/1980
JP S58-100727 A 6/1983

(Continued)

*Primary Examiner* — Stephen J Castellano
(74) *Attorney, Agent, or Firm* — Oliff PLC

(57) ABSTRACT

A triple containment tank includes: a tank foundation; a triple shell including an outer tank, an intermediate tank, and an inner tank; a first anchor strap extending through a first inter-tank region and a second inter-tank region and coupling an inner tank side plate and the tank foundation; and a second anchor strap extending through the second inter-tank region and coupling an intermediate tank side plate and the tank foundation. The first anchor strap includes: a first end portion coupled to the inner tank side plate; a second end portion coupled to the tank foundation; a first intermediate portion located between the first end portion and the second end portion and coupled to an inner wall-side portion of the intermediate tank; and a second intermediate portion located between the first end portion and the second end portion and coupled to an outer wall-side portion of the intermediate tank.

15 Claims, 6 Drawing Sheets

(52) U.S. Cl.
CPC ................. *F17C 2203/0631* (2013.01); *F17C 2205/0184* (2013.01); *F17C 2221/012* (2013.01); *F17C 2221/014* (2013.01); *F17C 2221/017* (2013.01); *F17C 2221/033* (2013.01); *F17C 2221/035* (2013.01); *F17C 2223/0161* (2013.01)

(58) Field of Classification Search
CPC ........ F17C 2205/013; F17C 2205/0149; F17C 2205/01; F17C 2205/0103; F17C 2205/0184; F17C 2270/0134
See application file for complete search history.

(56) References Cited

U.S. PATENT DOCUMENTS

| | | | | |
|---|---|---|---|---|
| 4,718,239 A * | 1/1988 | Nowobilski | F17C 3/10 | |
| | | | 62/50.7 | |
| 2022/0002988 A1 * | 1/2022 | Power | E04B 5/48 | |

FOREIGN PATENT DOCUMENTS

| | | | |
|---|---|---|---|
| JP | S63-158695 U | 10/1988 | |
| JP | H10-220697 A | 8/1998 | |
| JP | 2003-269698 A | 9/2003 | |
| KR | 10-2020-0106684 A | 9/2020 | |

* cited by examiner

TRIPLE CONTAINMENT TANK

CROSS-REFERENCE TO RELATED APPLICATIONS

This is a U.S. National Phase Application of PCT/JP2021/047383 filed on Dec. 21, 2021, which designates the United States and claims priority to Japanese Patent Application No. 2020-218833, filed Dec. 28, 2020, the entire contents of which are incorporated herein by reference.

TECHNICAL FIELD

The present disclosure relates to a flat-bottomed triple containment tank that stores a low temperature liquefied gas.

BACKGROUND ART

Flat-bottomed triple containment tanks that store a low temperature liquefied gas have been proposed. For example, PTL 1 discloses a flat-bottomed triple containment tank.

According to the triple containment tank disclosed in PTL 1, an outer tank is located on a tank foundation made of concrete. A substrate made of perlite concrete and having a cold insulation effect is located on a bottom plate of the outer tank. An intermediate tank is located on this substrate. A level concrete layer is located on a bottom plate of the intermediate tank. An inner tank is located on the level concrete layer. A mounting seat slidably supporting a peripheral portion of a bottom plate of the inner tank is located between the bottom plate of the inner tank and the level concrete layer in an upper-lower direction. An outer peripheral edge portion of the mounting seat extends to the vicinity of an inner wall of an intermediate tank and can contact, from below, a locking piece located on an inner wall of the intermediate tank. One end portion of a first anchor strap (anchor member) is coupled to a side plate of the inner tank, and the other end portion thereof is coupled to the mounting seat. One end portion of a second anchor strap is coupled to a side plate of the intermediate tank, and the other end portion thereof extends into and is fixed to the tank foundation.

CITATION LIST

Patent Literature

PTL 1: Japanese Laid-Open Patent Application Publication No. 55-20937

SUMMARY OF INVENTION

Technical Problem

In the triple containment tank of PTL 1, one end portion of the first anchor strap is coupled to the side plate of the inner tank, and the other end portion thereof is coupled to the mounting seat located between the bottom plate of the inner tank and the bottom plate of the intermediate tank. The mounting seat engages with the inner tank by friction but is not fixed to the inner tank and the intermediate tank and is not fixed to the tank foundation. It is desirable that one end portion of the anchor strap be fixed to the tank foundation. However, according to a typical triple containment tank, since the intermediate tank and the outer tank exist between the inner tank and the tank foundation, it is difficult to couple the inner tank and the tank foundation by the anchor strap while maintaining airtightness inside and outside the intermediate tank.

The present disclosure was made under these circumstances, and an object of the present disclosure is to, in a triple containment tank including a tank foundation and a triple shell including an outer tank located on the tank foundation, an intermediate tank, and an inner tank, propose a structure in which the inner tank and the tank foundation are coupled to each other by an anchor strap.

Solution to Problem

A triple containment tank according to one aspect of the present disclosure includes:

- a tank foundation;
- an outer tank including
  - an outer tank bottom plate located on the tank foundation,
  - a tubular outer tank side plate standing from the outer tank bottom plate, and
  - an outer tank roof covering an upper portion of the outer tank side plate;
- an intermediate tank including
  - an intermediate tank bottom plate located on the outer tank bottom plate through an outer bottom insulation layer,
  - a tubular intermediate tank side plate standing from the intermediate tank bottom plate, and
  - an intermediate tank roof covering an upper portion of the intermediate tank side plate;
- an inner tank storing a liquefied gas therein and including
  - an inner tank bottom plate located on the outer tank bottom plate through an inner bottom insulation layer,
  - a tubular inner tank side plate standing from the inner tank bottom plate, and
  - an inner tank roof located at an upper portion of the inner tank side plate;
- a first anchor strap extending through a first inter-tank region that is an inter-tank region between the inner tank and the intermediate tank and a second inter-tank region that is an inter-tank region between the intermediate tank and the outer tank and coupling the inner tank side plate and the tank foundation; and
- a second anchor strap extending through the second inter-tank region and coupling the intermediate tank side plate and the tank foundation, wherein
- the first anchor strap includes
  - a first end portion coupled to the inner tank side plate,
  - a second end portion coupled to the tank foundation,
  - a first intermediate portion located between the first end portion and the second end portion and coupled to an inner wall-side portion of the intermediate tank which is exposed to the first inter-tank region, and
  - a second intermediate portion located between the first end portion and the second end portion and coupled to an outer wall-side portion of the intermediate tank which is exposed to the second inter-tank region.

Advantageous Effects of Invention

The present disclosure can propose, in a triple containment tank including a tank foundation and a triple shell including an outer tank located on the tank foundation, an intermediate tank, and an inner tank, a structure in which the inner tank and the tank foundation are coupled to each other by an anchor strap.

DESCRIPTION OF EMBODIMENTS

Figure 1:
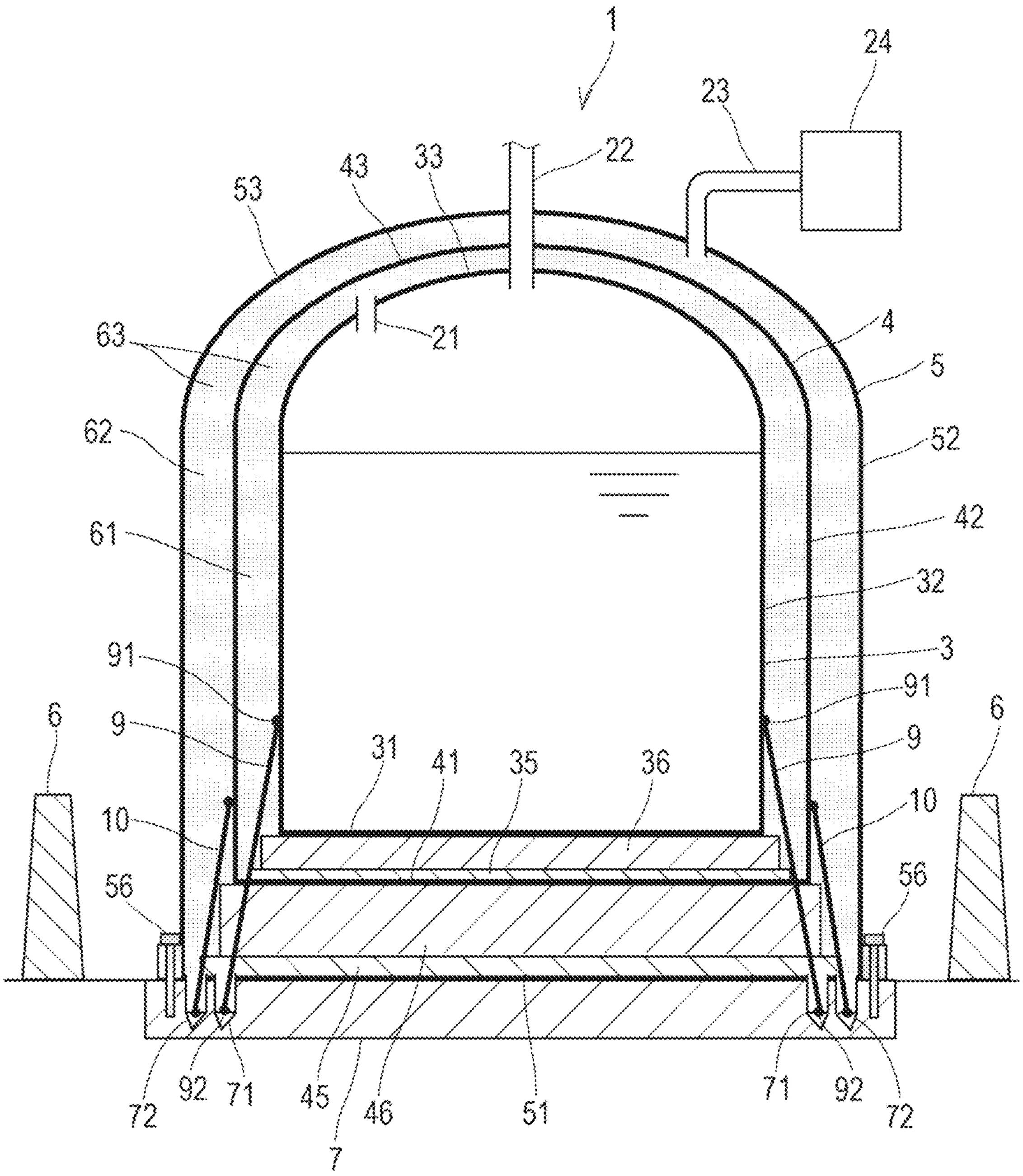
FIG. 1 is a sectional view showing an entire configuration of a triple containment tank according to an embodiment of the present disclosure.

An embodiment of the present disclosure will be described with reference to the drawings. FIG. 1 is a sectional view showing an entire configuration of a triple containment tank 1 according to the embodiment of the present disclosure.

The triple containment tank 1 shown in FIG. 1 is a flat-bottomed triple containment tank placed on the ground. The triple containment tank 1 includes: a tank foundation 7 made of concrete; an outer tank 5 located on the tank foundation 7; an intermediate tank 4 located inside the outer tank 5; and an inner tank 3 located inside the intermediate tank 4. The outer tank 5, the intermediate tank 4, and the inner tank 3 form a triple shell.

The inner tank 3 is a container that stores a low temperature liquefied gas. Examples of the low temperature liquefied gas include liquid helium, liquid hydrogen, liquid nitrogen, LNG, and LPG. A dike 6 made of concrete is located around the triple containment tank 1. The inner tank 3 includes: a substantially flat inner tank bottom plate 31; a cylindrical inner tank side plate 32 standing from the inner tank bottom plate 31; and a hemispherical inner tank roof 33 located at an upper portion of the inner tank side plate 32.

The intermediate tank 4 surrounds the inner tank 3. The intermediate tank 4 includes: a substantially flat intermediate tank bottom plate 41; a cylindrical intermediate tank side plate 42 standing from the intermediate tank bottom plate 41; and a hemispherical intermediate tank roof 43 located at an upper portion of the intermediate tank side plate 42. A level concrete layer 35 and an inner bottom insulation layer 36 are interposed between the intermediate tank bottom plate 41 and the inner tank bottom plate 31 in an upper-lower direction. The intermediate tank roof 43 may support the inner tank roof 33.

The outer tank 5 surrounds the intermediate tank 4. The outer tank 5 includes: a substantially flat outer tank bottom plate 51 located on the tank foundation 7; a cylindrical outer tank side plate 52 standing from the outer tank bottom plate 51; and a hemispherical (dome-shaped) outer tank roof 53 located at an upper portion of the outer tank side plate 52. A level concrete layer 45 and an outer bottom insulation layer 46 are interposed between the outer tank bottom plate 51 and the intermediate tank bottom plate 41 in the upper-lower direction. The outer tank side plate 52 is coupled to the tank foundation 7 by anchor bolts 56. Or, the outer tank bottom plate 51 may be fixed to an anchor plate driven in the tank foundation 7.

There is a gap between an outer wall of the inner tank 3 and an inner wall of the intermediate tank 4, i.e., a first inter-tank region 61 is located therebetween. There is a gap between an outer wall of the intermediate tank 4 and an inner wall of the outer tank 5, i.e., a second inter-tank region 62 is located therebetween. The first inter-tank region 61 and the second inter-tank region 62 are filled with an insulation 63. For example, the insulation 63 may be perlite, glass wool, or the like which has been used as an insulation of a multiple-shell tank.

A BOG pipe 22 is open at a top portion of the inner tank 3. A vaporized gas generated in the inner tank 3 is sent through the BOG pipe 22 to an outside of the triple containment tank 1. A delivering pipe (not shown) is open at a lower portion of the inner tank 3. The liquefied gas of the inner tank 3 is sent through the delivering pipe to the outside. However, the delivering pipe may extend upward in the inner tank 3 and send the liquefied gas to the outside through an upper portion of the triple containment tank 1. A communication pipe 21 through which an upper portion in the inner tank 3 and the first inter-tank region 61 communicate with each other is located at the inner tank roof 33 of the inner tank 3. The vaporized gas of the liquefied gas which is generated in the inner tank 3 flows into the first inter-tank region 61 through the communication pipe 21. Thus, the first inter-tank region 61 is filled with the vaporized gas of the liquefied gas. However, a gas having a low boiling point equal to that of the vaporized gas of the liquefied gas may be introduced to the first inter-tank region 61 from an outside of the triple containment tank 1. Or, the vaporized gas of the liquefied gas may be introduced to the first inter-tank region 61 by connecting a branch pipe of the BOG pipe 22 and the first inter-tank region 61.

The first inter-tank region 61 and the second inter-tank region 62 as spaces are separated from each other by airtightness of the intermediate tank 4 that separates the first inter-tank region 61 and the second inter-tank region 62. The second inter-tank region 62 is supplied with an inert gas from an inert gas supply source 24 through an introduction pipe 23 and filled with the inert gas. This inert gas is a gas having a higher boiling point than the liquefied gas stored in the inner tank 3. One example of such inert gas is nitrogen.

The inner tank side plate 32 and the tank foundation 7 are coupled to each other by first anchor straps 9. A large number of first anchor straps 9 are located around the inner tank side plate 32 in a circumferential direction at substantially regular intervals. The first anchor straps 9 extend through the first inter-tank region 61 and the second inter-tank region 62. The intermediate tank side plate 42 and the tank foundation 7 are coupled to each other by second anchor straps 10. A large number of second anchor straps 10 are located around the intermediate tank side plate 42 in a circumferential direction at substantially regular intervals. The second anchor straps 10 extend through the second inter-tank region 62. The first anchor straps 9 and the second anchor straps 10 are band-shaped bodies made of a material (SUS, for example) having low temperature toughness. However, the first anchor straps 9 and the second anchor straps 10 may be shaft-shaped bodies or wire-shaped bodies.

A first end portion 91 that is an upper end of the first anchor strap 9 is coupled to an outer wall of the inner tank side plate 32. The first end portion 91 of the first anchor strap 9 may be coupled to the outer wall of the inner tank side plate 32 so as to be allowed to be displaced in the upper-lower direction on the outer wall of the inner tank side plate 32. A second end portion 92 that is a lower end of the first anchor strap 9 is coupled by welding to a bottom portion of an anchor box 71 that penetrates the outer tank bottom plate 51 and is fitted in the tank foundation 7.

Structure in which Inner Tank Side Plate 32 and Tank Foundation 7 are Coupled to Each Other by First Anchor Straps 9

Each first anchor strap 9 includes the first end portion 91 coupled to the inner tank side plate 32 and the second end portion 92 coupled to the tank foundation 7, and in addition, includes: a first intermediate portion 93 located between the first end portion 91 and the second end portion 92 and coupled to an inner wall-side portion of the intermediate tank 4 which is exposed to the first inter-tank region 61; and a second intermediate portion 94 located between the first end portion 91 and the second end portion 92 and coupled to an outer wall-side portion of the intermediate tank 4 which is exposed to the second inter-tank region 62. Hereinafter, First to Sixth Examples of the structure in which the inner tank side plate 32 and the tank foundation 7 are coupled to each other by the first anchor straps 9 will be described.

First Example

Figure 2:
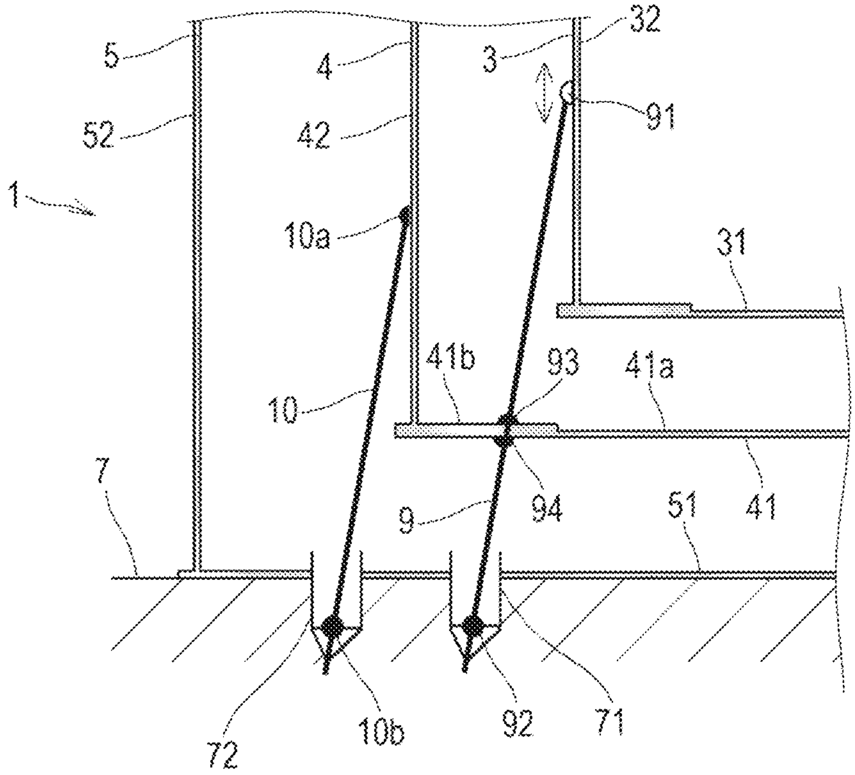
FIG. 2 is a diagram for explaining First Example of a structure in which an inner tank side plate and a tank foundation are coupled to each other by first anchor straps.

FIG. 2 is a diagram for explaining First Example of the structure in which the inner tank side plate 32 and the tank foundation 7 are coupled to each other by the first anchor straps 9. In First Example shown in FIG. 2, the first end portion 91 of the first anchor strap 9 is coupled to the outer wall of the inner tank side plate 32, and the second end portion 92 of the first anchor strap 9 is coupled to the tank foundation 7. The first anchor strap 9 of First Example is continuous from the first end portion 91 to the second end portion 92 and is inserted into the intermediate tank bottom plate 41 at a position between the first end portion 91 and the second end portion 92. The intermediate tank bottom plate 41 includes: a bottom plate 41*a* forming a middle portion; and an annular plate 41*b* that is located at a periphery of the bottom plate 41*a* and is thicker than the bottom plate 41*a*. It is desirable that the first anchor strap 9 be inserted into the annular plate 41*b*.

Regarding the first anchor strap 9, a portion located right above a portion inserted into the intermediate tank bottom plate 41 is the first intermediate portion 93, and a portion right under the portion inserted into the intermediate tank bottom plate 41 is the second intermediate portion 94. Then, an inner wall-side portion of the intermediate tank bottom plate 41 and the first intermediate portion 93 of the first anchor strap 9 are welded to each other, and an outer wall-side portion of the intermediate tank bottom plate 41 and the second intermediate portion 94 of the first anchor strap 9 are coupled to each other by welding. A gap between the first intermediate portion 93 and the intermediate tank bottom plate 41 and a gap between the second intermediate portion 94 and the intermediate tank bottom plate 41 are filled by welding, and the airtightness inside and outside the intermediate tank 4 is maintained.

In First to Sixth Examples, one end portion 10*a* of the second anchor strap 10 is coupled to an outer wall of the intermediate tank side plate 42 by welding or another method, and the other end portion 10*b* of the second anchor strap 10 is coupled by welding to an anchor box 72 that penetrates the outer tank bottom plate 51 and is embedded in the tank foundation 7.

Second Example

Figure 3:
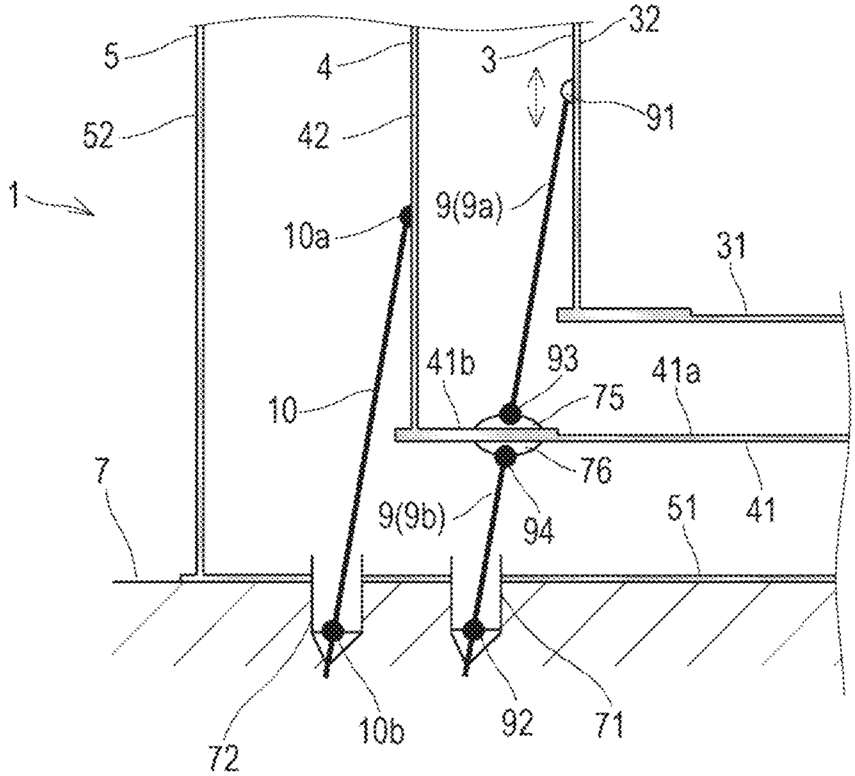
FIG. 3 is a diagram for explaining Second Example of the structure in which the inner tank side plate and the tank foundation are coupled to each other by the first anchor straps.

FIG. 3 is a diagram for explaining Second Example of the structure in which the inner tank side plate 32 and the tank foundation 7 are coupled to each other by the first anchor straps 9. In Second Example shown in FIG. 3, the intermediate tank bottom plate 41 includes a first coupling portion 75 located at the inner wall-side portion and a second coupling portion 76 located at the outer wall-side portion. It is desirable that the first coupling portion 75 and the second coupling portion 76 be located at the annular plate 41*b* of the intermediate tank bottom plate 41.

The first anchor strap 9 of Second Example is divided at a position between the first intermediate portion 93 and the second intermediate portion 94 and includes: a first strap body 9*a* extending from the first end portion 91 coupled to the inner tank side plate 32 to the first intermediate portion 93 coupled to the first coupling portion 75; and a second strap body 9*b* extending from the second intermediate portion 94 coupled to the second coupling portion 76 to the second end portion 92 coupled to the tank foundation 7. The first strap body 9*a* and the second strap body 9*b* are located one a substantially straight line. The first intermediate portion 93 of the first anchor strap 9 and the first coupling portion 75 are coupled to each other by welding. Similarly, the second intermediate portion 94 of the first anchor strap 9 and the second coupling portion 76 are coupled to each other by welding.

In Second Example, unlike First Example, the first anchor strap 9 does not penetrate the intermediate tank 4. Therefore, the airtightness of the intermediate tank 4 does not deteriorate, and the leakage of the gas from the first inter-tank region 61 to the second inter-tank region 62 can be prevented more surely.

Third Example

Figure 4:
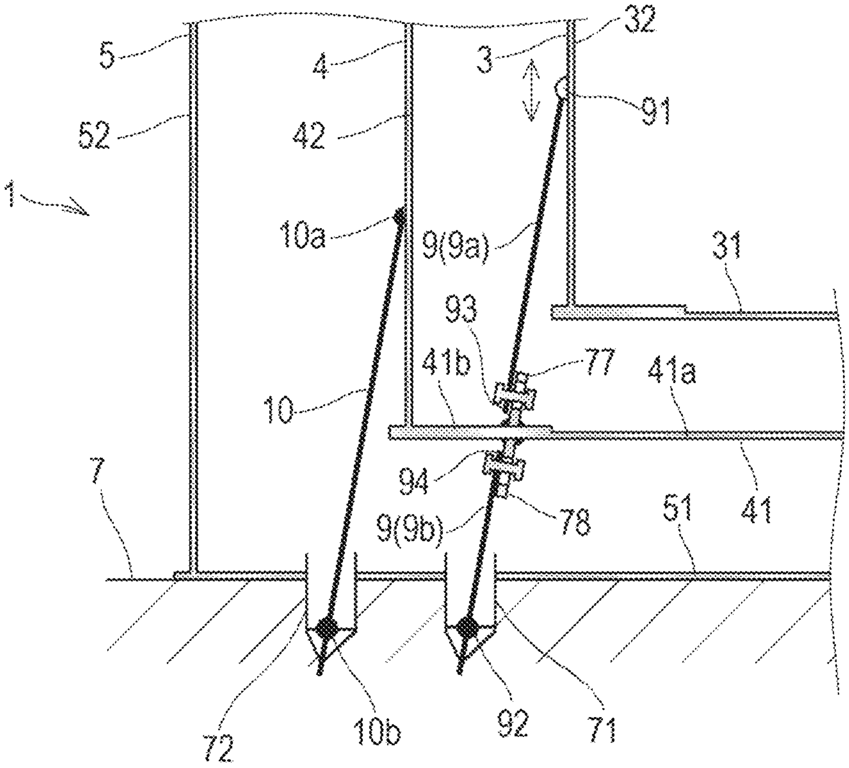
FIG. 4 is a diagram for explaining Third Example of the structure in which the inner tank side plate and the tank foundation are coupled to each other by the first anchor straps.

FIG. 4 is a diagram for explaining Third Example of the structure in which the inner tank side plate 32 and the tank foundation 7 are coupled to each other by the first anchor straps 9. In Third Example shown in FIG. 4, the intermediate tank bottom plate 41 includes a first coupling portion 77 located at the inner wall-side portion and a second coupling portion 78 located at the outer wall-side portion. It is desirable that the first coupling portion 77 and the second coupling portion 78 be located at the annular plate 41*b* of the intermediate tank bottom plate 41. Each of the first coupling portion 77 and the second coupling portion 78 includes an elongated hole that is substantially parallel to an extending direction of the first anchor strap 9.

The first anchor strap 9 of Third Example is divided at a position between the first intermediate portion 93 and the second intermediate portion 94 and includes: the first strap body 9*a* extending from the first end portion 91 coupled to the inner tank side plate 32 to the first intermediate portion 93 coupled to the first coupling portion 77; and the second strap body 9*b* extending from the second intermediate portion 94 coupled to the second coupling portion 78 to the second end portion 92 coupled to the tank foundation 7. The first strap body 9*a* and the second strap body 9*b* are located on a substantially straight line. The first intermediate portion 93 of the first anchor strap 9 and the first coupling portion 77 are pin-joined to each other so as to be turnable. Specifically, the first intermediate portion 93 of the first strap body 9*a* and the first coupling portion 77 are pin-Joined to each other by a pin inserted into the first intermediate portion 93 of the first strap body 9*a* and the elongated hole of the first coupling portion 77. A coupling position of the first intermediate portion 93 is variable within a range of the elongated hole located at the first coupling portion 77. Similarly, the second intermediate portion 94 of the first anchor strap 9 and the second coupling portion 76 are pin-joined to each other so as to be turnable. Specifically, the second intermediate portion 94 of the second strap body 9*b* and the second coupling portion 78 are pin-joined to each other by a bolt inserted into the second intermediate portion 94 of the second strap body 9*b* and the elongated hole of the second coupling portion 78. A coupling position of the second intermediate portion 94 is variable within a range of the elongated hole located at the second coupling portion 78. However, both of the first intermediate portion 93 and the second intermediate portion 94 do not have to be pin-joined, and one of the first intermediate portion 93 and the second intermediate portion 94 may be pin-joined.

Figure 5:
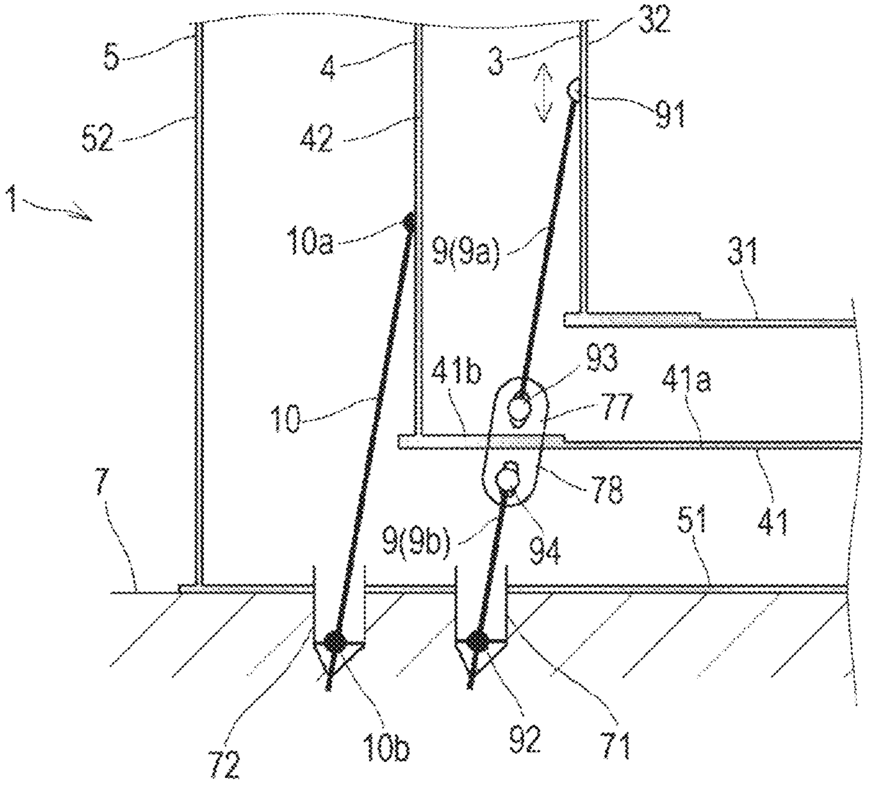
FIG. 5 is a diagram for explaining a modified example of Third Example of the structure in which the inner tank side plate and the tank foundation are coupled to each other by the first anchor straps.

FIG. 5 is a diagram for explaining a modified example of Third Example of the structure in which the inner tank side plate 32 and the tank foundation 7 are coupled to each other by the first anchor straps 9. In this modified example, as with the example shown in FIG. 4, the first coupling portion 77 and the second coupling portion 78 are located at the annular plate 41*b* of the intermediate tank bottom plate 41. Then, the first intermediate portion 93 of the first anchor strap 9 and the first coupling portion 77 are pin-joined to each other by a bolt inserted into an elongated hole of the first coupling portion 77. A coupling position of the first intermediate portion 93 is variable within the range of the elongated hole of the first coupling portion 77. Moreover, the second intermediate portion 94 of the first anchor strap 9 and the second coupling portion 78 are pin-joined to each other by a bolt inserted into an elongated hole of the second coupling portion 78. A coupling position of the second intermediate portion 94 is variable within the range of the elongated hole of the second coupling portion 78.

In Third Example (and the modified example), unlike First Example, the first anchor strap 9 does not penetrate the intermediate tank 4. Therefore, the airtightness of the intermediate tank 4 does not deteriorate, and the leakage of the gas from the first inter-tank region 61 to the second inter-tank region 62 can be prevented more surely. Moreover, in Third Example, unlike Second Example, each of the first intermediate portion 93 and the second intermediate portion 94 is displaceable within the range of the elongated hole. Therefore, stress acting on the first anchor strap 9 by thermal contraction of the inner tank 3 can be relaxed by the displacement of the first intermediate portion 93 and the second intermediate portion 94.

Fourth Example

Figure 6:
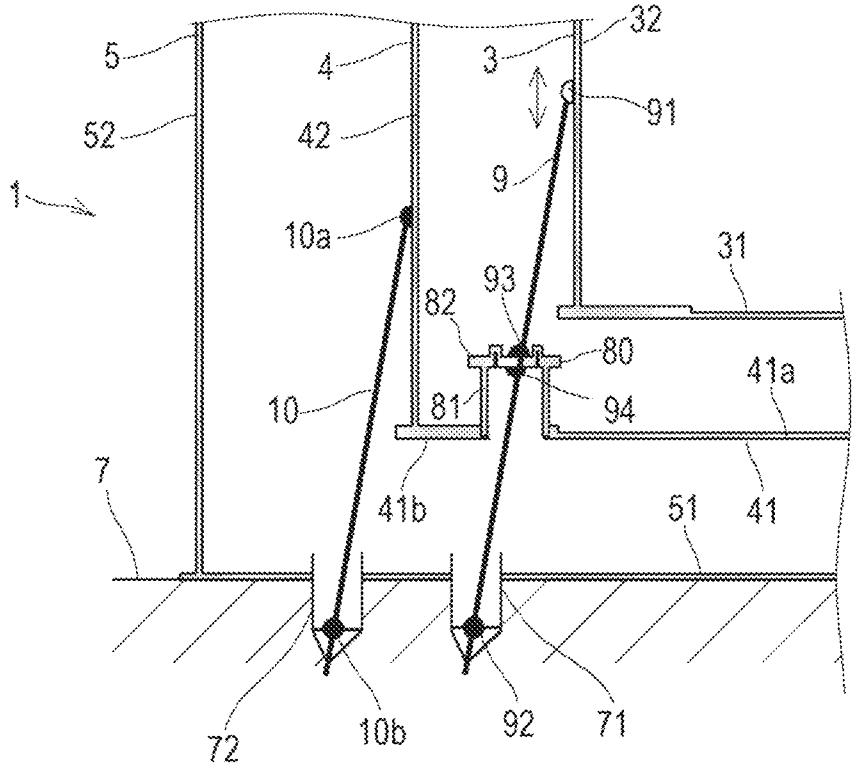
FIG. 6 is a diagram for explaining Fourth Example of the structure in which the inner tank side plate and the tank foundation are coupled to each other by the first anchor straps.

FIG. 6 is a diagram for explaining Fourth Example of the structure in which the inner tank side plate 32 and the tank foundation 7 are coupled to each other by the first anchor straps 9. In Fourth Example shown in FIG. 6, a connection box 80 including a side plate 81 and an upper plate 82 is located at the intermediate tank bottom plate 41. The side plate 81 is a tubular body fixed to the annular plate 41*b* of the intermediate tank bottom plate 41 by welding. An upper portion of the side plate 81 is closed by the upper plate 82. The upper plate 82 includes an expandable portion. The expandable portion is realized by, for example, corrugation formed on the upper plate 82.

The first anchor strap 9 according to Fourth Example is a band-shaped or wire-shaped body that is continuous from the first end portion 91 to the second end portion 92. The first anchor strap 9 according to Fourth Example is inserted into the tipper plate 82 at a position between the first end portion 91 and the second end portion 92. Regarding the first anchor strap 9, a portion located right above a portion inserted into the upper plate 82 is the first intermediate portion 93, and a portion right under the portion inserted into the upper plate 82 is the second intermediate portion 94. Then, an upper surface of the upper plate 82 and the first intermediate portion 93 of the first anchor strap 9 are coupled to each other by welding, and a lower surface of the upper plate 82 and the second intermediate portion 94 of the first anchor strap 9 are coupled to each other by welding. A gap between the upper plate 82 and the first intermediate portion 93 and a gap between the upper plate 82 and the second intermediate portion 94 are filled by welding, and therefore, the airtightness of the intermediate tank 4 is maintained.

In Fourth Example, the connection box 80 includes the expandable portion Therefore, unlike First Example, the stress acting on the intermediate tank 4 by the thermal contraction of the inner tank 3 can be relaxed by the deformation of the expandable portion.

Fifth Example

Figure 7:
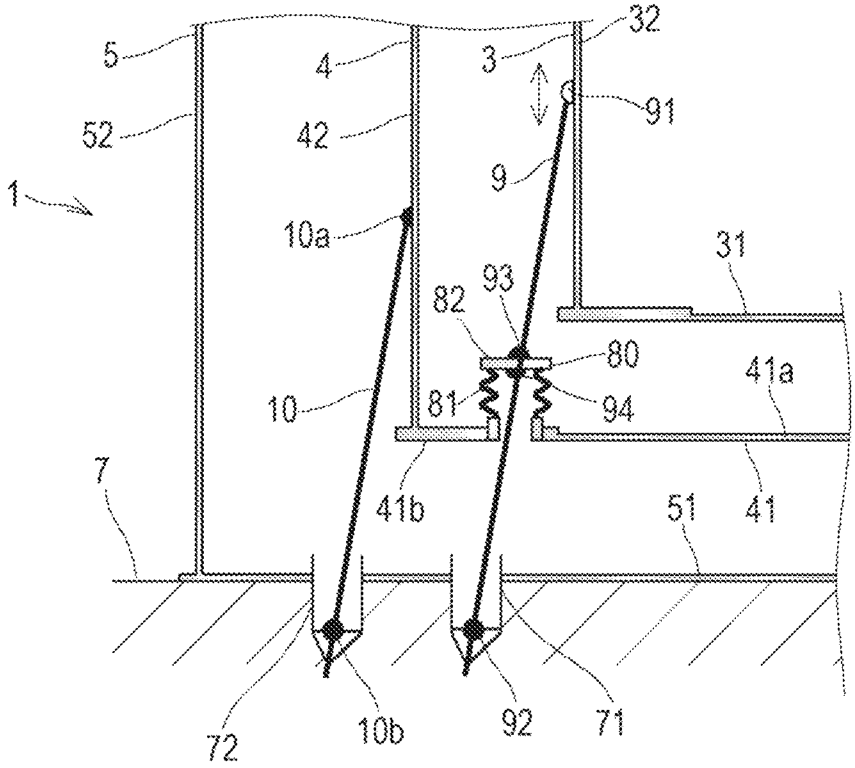
FIG. 7 is a diagram for explaining Fifth Example of the structure in which the inner tank side plate and the tank foundation are coupled to each other by the first anchor straps.

FIG. 7 is a diagram for explaining Fifth Example of the structure in which the inner tank side plate 32 and the tank foundation 7 are coupled to each other by the first anchor straps 9. In Fifth Example shown in FIG. 7, the connection box 80 including the side plate 81 and the tipper plate 82 is located at the intermediate tank bottom plate 41. The side plate 81 is a tubular body fixed to the annular plate 41*b* of the intermediate tank bottom plate 41 by welding. The upper portion of the side plate 81 is closed by the upper plate 82. The tipper plate 82 includes an expandable portion. The expandable portion is realized in such a manner that the side plate 81 is formed by an expandable pipe.

The first anchor strap 9 according to Fifth Example is a band-shaped or wire-shaped body that is continuous from the first end portion 91 to the second end portion 92. The first anchor strap 9 according to Fifth Example is inserted into the upper plate 82 at a position between the first end portion 91 and the second end portion 92. Regarding the first anchor strap 9, a portion located right above a portion inserted into the upper plate 82 is the first intermediate portion 93, and a portion right under the portion inserted into the upper plate 82 is the second intermediate portion 94. However, the first anchor strap 9 may be divided at a position between the first intermediate portion 93 and the second intermediate portion 94 without being inserted into the upper plate 82. Then, the upper surface of the upper plate 82 and the first intermediate portion 93 of the first anchor strap 9 are coupled to each other by welding, and the lower surface of the upper plate 82 and the second intermediate portion 94 of the first anchor strap 9 are coupled to each other by welding. A gap between the upper plate 82 and the first intermediate portion 93 and a gap between the upper plate 82 and the second intermediate portion 94 are filled by welding, and therefore, the airtightness of the intermediate tank 4 is maintained.

In Fifth Example, the connection box 80 includes the expandable portion. Therefore, unlike First Example, the stress acting on the intermediate tank 4 by the thermal contraction of the inner tank 3 can be relaxed by the deformation of the expandable portion.

Sixth Example

Figure 8:
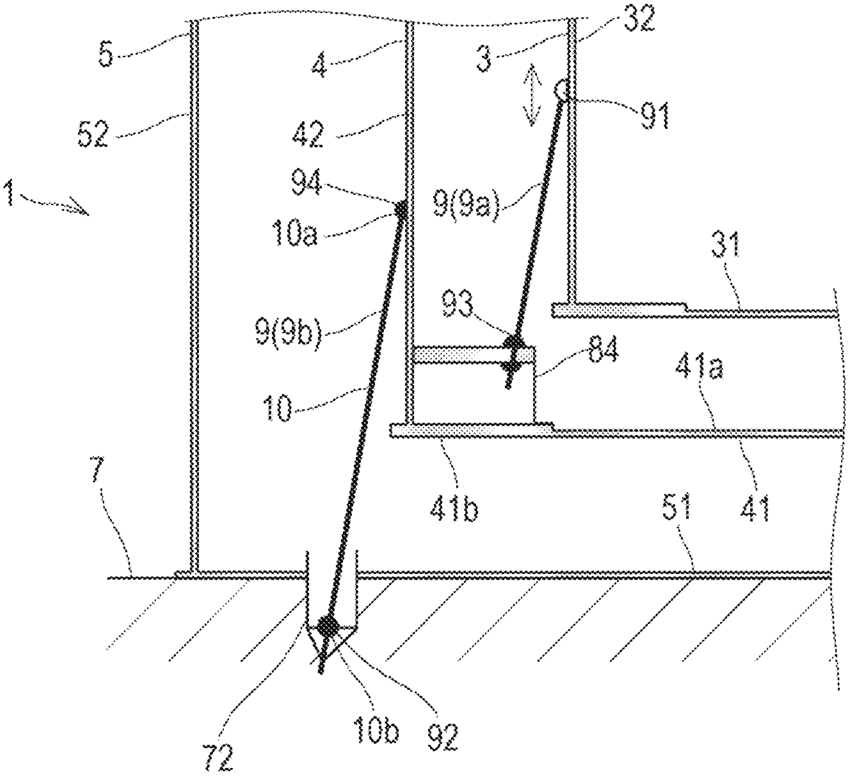
FIG. 8 is a diagram for explaining Sixth Example of the structure in which the inner tank side plate and the tank foundation are coupled to each other by the first anchor straps.

FIG. 8 is a diagram for explaining Sixth Example of the structure in which the inner tank side plate 32 and the tank foundation 7 are coupled to each other by the first anchor straps 9. In Sixth Example shown in FIG. 8, the intermediate tank bottom plate 41 includes: the annular plate 41*b* forming a peripheral portion of the intermediate tank bottom plate 41; and a bracket 84 fixed to the annular plate 41*b* and the intermediate tank side plate 42 by welding at the inner wall-side portion of the intermediate tank 4.

The first anchor strap 9 of Sixth Example is divided at a position between the first intermediate portion 93 and the second intermediate portion 94 and includes: the first strap body 9*a* extending from the first end portion 91 coupled to the outer wall of the inner tank side plate 32 to the first intermediate portion 93 coupled to the bracket 84; and the second strap body 9*b* extending from the second intermediate portion 94 coupled to the outer wall of the intermediate tank side plate 42 to the second end portion 92 coupled to the tank foundation 7. To be specific, the first strap body 9*a* and the second strap body 9*b* are coupled to each other by a rigid body including the annular plate 41*b* of the intermediate tank bottom plate 41, a lower portion of the intermediate tank side plate 42, and the bracket 84.

In Sixth Example, the second strap body 9*b* and the second anchor strap 10 are integrated with each other. Therefore, as the second anchor strap 10 of Sixth Example, it is desirable to use a band-shaped body that is wider or thicker than those of First to Fifth Examples. However, the second strap body 9*b* and the second anchor strap 10 may be separately located and may be lined up.

In Sixth Example, unlike First Example, the first anchor strap 9 does not penetrate the intermediate tank 4. Therefore, the airtightness of the intermediate tank 4 does not deteriorate, and the leakage of the gas from the first inter-tank region 61 to the second inter-tank region 62 can be prevented more surely.

SUMMARY

As described above, the triple containment tank 1 according to the present embodiment includes:

- the tank foundation 7;
- the outer tank 5 including
  - the outer tank bottom plate 51 located on the tank foundation 7,
  - the tubular outer tank side plate 52 standing from the outer tank bottom plate 51, and
  - the outer tank roof 53 covering the upper portion of the outer tank side plate 52;
- the intermediate tank 4 including
  - the intermediate tank bottom plate 41 located on the outer tank bottom plate 51 through the outer bottom insulation layer 46,
  - the tubular intermediate tank side plate 42 standing from the intermediate tank bottom plate 41, and
  - the intermediate tank roof 43 covering the upper portion of the intermediate tank side plate 42;
- the inner tank 3 storing the liquefied gas therein and including
  - the inner tank bottom plate 31 located on the intermediate tank bottom plate 41 through the inner bottom insulation layer 36,
  - the tubular inner tank side plate 32 standing from the inner tank bottom plate 31, and
  - the inner tank roof 33 located at the upper portion of the inner tank side plate 32;
- the first anchor strap 9 extending through the first inter-tank region 61 that is an inter-tank region between the inner tank 3 and the intermediate tank 4 and the second inter-tank region 62 that is an inter-tank region between the intermediate tank 4 and the outer tank 5 and coupling the inner tank side plate 32 and the tank foundation 7; and
- the second anchor strap 10 extending through the second inter-tank region 62 and coupling the intermediate tank side plate 42 and the tank foundation 7.

Then, the first anchor strap 9 includes the first end portion 91 coupled to the inner tank side plate 32 and the second end portion 92 coupled to the tank foundation 7. The first anchor strap 9 further includes: the first intermediate portion 93 located between the first end portion 91 and the second end portion 92 and coupled to the inner wall-side portion of the intermediate tank 4 which is exposed to the first inter-tank region 61; and the second intermediate portion 94 located between the first end portion 91 and the second end portion 92 and coupled to the outer wall-side portion of the intermediate tank 4 which is exposed to the second inter-tank region 62.

In the triple containment tank 1 configured as above, the inner tank side plate 32 and the tank foundation 7 can be coupled to each other by the first anchor strap 9 with the intermediate tank 4 interposed therebetween.

In the above embodiment, the first inter-tank region 61 and the inside of the inner tank 3 communicate with each other. The first inter-tank region 61 is filled with the vaporized gas of the liquefied gas. The second inter-tank region 62 is filled with the gas having a higher boiling point than the liquefied gas.

The first intermediate portion 93 of the first anchor strap 9 is coupled to the inner wall-side portion of the intermediate tank 4, and the second intermediate portion 94 of the first anchor strap 9 is coupled to the outer wall-side portion of the intermediate tank 4. Therefore, the first anchor strap 9 can be included while maintaining the airtightness inside and outside the intermediate tank 4. Thus, even when the gas filled in the first inter-tank region 61 and the gas filled in the second inter-tank region 62 are different from each other as described above, the leakage of these gases and the mixture of these gases are prevented. Moreover, when the first inter-tank region 61 and the inside of the inner tank 3 communicate with each other, and the first inter-tank region 61 is filled with the vaporized gas, the pressure difference between the inner and outer tanks can be reduced, and the stress acting on the first anchor strap 9 can be reduced.

As shown in First Example, the first anchor strap 9 may be a band-shaped or wire-shaped body that is continuous from the first end portion 91 to the second end portion 92. The first anchor strap 9 may be inserted into the intermediate tank bottom plate 41 at a position between the first end portion 91 and the second end portion 92. The first intermediate portion 93 and the second intermediate portion 94 may be coupled to the intermediate tank bottom plate 41 by welding.

As shown in Second and Third Examples, the intermediate tank bottom plate 41 may include: the first coupling portion 75 or 77 located at the inner wall-side portion; and the second coupling portion 76 or 78 located at the outer wall-side portion. The first anchor strap 9 may include: the first strap body 9*a* extending from the first end portion 91 coupled to the inner tank side plate 32 to the first intermediate portion 93 coupled to the first coupling portion 75 or 77; and the second strap body 9*b* extending from the second intermediate portion 94 coupled to the second coupling portion 76 or 78 to the second end portion 92 coupled to the tank foundation 7. Herein, the first strap body 9*a* and the second strap body 9*b* may be located on a substantially straight line.

As shown in Third Example, at least one of the first intermediate portion 93 and the second intermediate portion 94 may be pin-joined.

As shown in Fourth and Fifth Examples, the intermediate tank bottom plate 41 may include the connection box 80 including the side plate 81 and the upper plate 82. The first intermediate portion 93 and the second intermediate portion 94 may be coupled to the upper plate 82 by welding. Herein, it is desirable that at least one of the side plate 81 and the upper plate 82 include the expandable portion. Moreover, the first anchor strap 9 may be a band-shaped or wire-shaped body that is continuous from the first end portion 91 to the second end portion 92.

As shown in Sixth Example, the intermediate tank bottom plate 41 may include: the annular plate 41*b* located at the peripheral portion of the intermediate tank bottom plate 41; and the bracket 84 fixed to the annular plate 41*b* and the intermediate tank side plate 42 at the inner wall-side portion of the intermediate tank 4. The first anchor strap 9 may include: the first strap body 9*a* extending from the first end portion 91 coupled to the inner tank side plate 32 to the first intermediate portion 93 coupled to the bracket 84; and the second strap body 9*b* extending from the second intermediate portion 94 coupled to the outer wall-side portion of the intermediate tank side plate 42 to the second end portion 92 coupled to the tank foundation 7. The second anchor strap 10 may be integrated with the second strap body 9*b* or may be lined up with the second strap body 9*b*.

The foregoing has described a preferred embodiment of the present disclosure. Modifications of specific structures and/or functional details of the above embodiment may be included in the present disclosure as long as they are within the scope of the present disclosure. The above configuration may be changed as below, for example.

For example, in the above embodiment, the inner tank 3, the intermediate tank 4, and the outer tank 5 are cylindrical flat-bottomed tanks. However, the shape of the tank is not limited to a cylindrical shape, and the tank may be a flat-bottomed tank having a substantially polygonal tubular shape.

For example, in the above embodiment, the dike 6 is located around the triple containment tank 1. However, the dike 6 may be omitted.

REFERENCE SIGNS LIST

1 triple containment tank
3 inner tank
4 intermediate tank
5 outer tank
7 tank foundation
9 first anchor strap
9*a* first strap body
9*b* second strap body
10 second anchor strap
31 inner tank bottom plate
32 inner tank side plate
33 inner tank roof
36 inner bottom insulation layer
41 intermediate tank bottom plate
41*b* annular plate
42 intermediate tank side plate
43 intermediate tank roof
46 outer bottom insulation layer
51 outer tank bottom plate
52 outer tank side plate
53 outer tank roof
61 first inter-tank region
62 second inter-tank region
75 first coupling portion
76 second coupling portion
77 first coupling portion
78 second coupling portion
81 side plate
82 upper plate
84 bracket
91 first end portion
92 second end portion
93 first intermediate portion
94 second intermediate portion

The invention claimed is:

1. A triple containment tank comprising:
a tank foundation;
an outer tank including
an outer tank bottom plate located on the tank foundation,
a tubular outer tank side plate standing from the outer tank bottom plate, and
an outer tank roof covering an upper portion of the outer tank side plate;
an intermediate tank including
an intermediate tank bottom plate located on the outer tank bottom plate through an outer bottom insulation layer,
a tubular intermediate tank side plate standing from the intermediate tank bottom plate, and
an intermediate tank roof covering an upper portion of the intermediate tank side plate;
an inner tank storing a liquefied gas therein and including
an inner tank bottom plate located on the intermediate tank bottom plate through an inner bottom insulation layer,
a tubular inner tank side plate standing from the inner tank bottom plate, and
an inner tank roof located at an upper portion of the inner tank side plate;
a first anchor strap extending through a first inter-tank region that is an inter-tank region between the inner tank and the intermediate tank and a second inter-tank region that is an inter-tank region between the intermediate tank and the outer tank and coupling the inner tank side plate and the tank foundation; and
a second anchor strap extending through the second inter-tank region and coupling the intermediate tank side plate and the tank foundation, wherein the first anchor strap includes
a first end portion coupled to the inner tank side plate,
a second end portion coupled to the tank foundation,
a first intermediate portion located between the first end portion and the second end portion and non-movably fixed to an inner wall-side portion of the intermediate tank which is exposed to the first inter-tank region, and
a second intermediate portion located between the first end portion and the second end portion and coupled to an outer wall-side portion of the intermediate tank which is exposed to the second inter-tank region.

2. The triple containment tank according to claim 1, wherein:
the first anchor strap is a band-shaped or wire-shaped body that is continuous from the first end portion to the second end portion;
the first anchor strap is inserted into the intermediate tank bottom plate at a position between the first end portion and the second end portion; and
the first intermediate portion and the second intermediate portion are coupled to the intermediate tank bottom plate by welding.

3. The triple containment tank according to claim 1, wherein:
the intermediate tank bottom plate includes
a first coupling portion located at the inner wall-side portion and
a second coupling portion located at the outer wall-side portion; and
the first anchor strap includes
a first strap body extending from the first end portion coupled to the inner tank side plate to the first intermediate portion coupled to the first coupling portion and
a second strap body extending from the second intermediate portion coupled to the second coupling portion to the second end portion coupled to the tank foundation.

4. The triple containment tank according to claim 3, wherein the first strap body and the second strap body are located on a substantially straight line.

5. The triple containment tank according to claim 3, wherein at least one of the first intermediate portion and the second intermediate portion is pin-joined.

6. The triple containment tank according to claim 1, wherein:
the intermediate tank bottom plate includes a box including a side plate and an upper plate; and
the first intermediate portion and the second intermediate portion of the first anchor strap are coupled to the upper plate by welding.

7. The triple containment tank according to claim 6, wherein at least one of the side plate and the upper plate of the intermediate tank bottom plate includes an expandable portion.

8. The triple containment tank according to claim 6, wherein the first anchor strap is a band-shaped or wire-shaped body that is continuous from the first end portion to the second end portion.

9. The triple containment tank according to claim 1, wherein:
the intermediate tank bottom plate includes
an annular plate located at a peripheral portion of the intermediate tank bottom plate and
a bracket fixed to the annular plate and the intermediate tank side plate at the inner wall-side portion of the intermediate tank;
the first anchor strap includes
a first strap body extending from the first end portion coupled to the inner tank side plate to the first intermediate portion coupled to the bracket and
a second strap body extending from the second intermediate portion coupled to the outer wall-side portion of the intermediate tank side plate to the second end portion coupled to the tank foundation; and
the second anchor strap is integrated with the second strap body or is lined up with the second strap body.

10. The triple containment tank according to claim 1, wherein:
the first inter-tank region is filled with a vaporized gas of the liquefied gas; and
the second inter-tank region is filled with a gas having a higher boiling point than the liquefied gas.

11. The triple containment tank according to claim 10, wherein the first inter-tank region and the inner tank communicate with each other.

12. The triple containment tank according to claim 1, wherein
the first intermediate portion of the first anchor strap is non-movably fixed to an annular plate or a member rigidly fixed to the annular plate of the inner wall-side portion of the intermediate tank.

13. A triple containment tank comprising:
a tank foundation;
an outer tank including
an outer tank bottom plate located on the tank foundation,
a tubular outer tank side plate standing from the outer tank bottom plate, and
an outer tank roof covering an upper portion of the outer tank side plate;
an intermediate tank including
an intermediate tank bottom plate located on the outer tank bottom plate through an outer bottom insulation layer,
a tubular intermediate tank side plate standing from the intermediate tank bottom plate, and
an intermediate tank roof covering an upper portion of the intermediate tank side plate;
an inner tank storing a liquefied gas therein and including
an inner tank bottom plate located on the intermediate tank bottom plate through an inner bottom insulation layer,
a tubular inner tank side plate standing from the inner tank bottom plate, and
an inner tank roof located at an upper portion of the inner tank side plate;
a first anchor strap extending through a first inter-tank region that is an inter-tank region between the inner tank and the intermediate tank and a second inter-tank region that is an inter-tank region between the intermediate tank and the outer tank and coupling the inner tank side plate and the tank foundation; and
a second anchor strap extending through the second inter-tank region and coupling the intermediate tank side plate and the tank foundation, wherein
the first anchor strap includes
a first end portion coupled to the inner tank side plate,
a second end portion coupled to the tank foundation,
a first intermediate portion located between the first end portion and the second end portion and coupled to an inner wall-side portion of the intermediate tank which is exposed to the first inter-tank region, and a second intermediate portion located between the first end portion and the second end portion and coupled to an outer wall-side portion of the intermediate tank which is exposed to the second inter-tank region, the first inter-tank region is filled with a vaporized gas of the liquefied gas; and the second inter-tank region is filled with a gas having a higher boiling point than the liquefied gas.

14. A triple containment tank comprising:

a tank foundation;

an outer tank including an outer tank bottom plate located on the tank foundation, a tubular outer tank side plate standing from the outer tank bottom plate, and an outer tank roof covering an upper portion of the outer tank side plate;

an intermediate tank including an intermediate tank bottom plate located on the outer tank bottom plate through an outer bottom insulation layer, a tubular intermediate tank side plate standing from the intermediate tank bottom plate, and an intermediate tank roof covering an upper portion of the intermediate tank side plate;

an inner tank storing a liquefied gas therein and including an inner tank bottom plate located on the intermediate tank bottom plate through an inner bottom insulation layer, a tubular inner tank side plate standing from the inner tank bottom plate, and an inner tank roof located at an upper portion of the inner tank side plate;

a first anchor strap extending through a first inter-tank region that is an inter-tank region between the inner tank and the intermediate tank and a second inter-tank region that is an inter-tank region between the intermediate tank and the outer tank and coupling the inner tank side plate and the tank foundation; and a second anchor strap extending through the second inter-tank region and coupling the intermediate tank side plate and the tank foundation, wherein the first anchor strap includes a first end portion coupled to the inner tank side plate, a second end portion coupled to the tank foundation, a first intermediate portion located between the first end portion and the second end portion and coupled to an inner wall-side portion of the intermediate tank which is exposed to the first inter-tank region, and a second intermediate portion located between the first end portion and the second end portion and coupled to an outer wall-side portion of the intermediate tank which is exposed to the second inter-tank region, the intermediate tank bottom plate includes a first coupling portion located at the inner wall-side portion, and a second coupling portion located at the outer wall-side portion; and the first anchor strap includes a first strap body extending from the first end portion coupled to the inner tank side plate to the first intermediate portion coupled to the first coupling portion, and a second strap body extending from the second intermediate portion coupled to the second coupling portion to the second end portion coupled to the tank foundation, and at least one of the first intermediate portion and the second intermediate portion is pin-joined.

15. A triple containment tank comprising:

a tank foundation;

an outer tank including an outer tank bottom plate located on the tank foundation, a tubular outer tank side plate standing from the outer tank bottom plate, and an outer tank roof covering an upper portion of the outer tank side plate;

an intermediate tank including an intermediate tank bottom plate located on the outer tank bottom plate through an outer bottom insulation layer, a tubular intermediate tank side plate standing from the intermediate tank bottom plate, and an intermediate tank roof covering an upper portion of the intermediate tank side plate;

an inner tank storing a liquefied gas therein and including an inner tank bottom plate located on the intermediate tank bottom plate through an inner bottom insulation layer, a tubular inner tank side plate standing from the inner tank bottom plate, and an inner tank roof located at an upper portion of the inner tank side plate;

a first anchor strap extending through a first inter-tank region that is an inter-tank region between the inner tank and the intermediate tank and a second inter-tank region that is an inter-tank region between the intermediate tank and the outer tank and coupling the inner tank side plate and the tank foundation; and a second anchor strap extending through the second inter-tank region and coupling the intermediate tank side plate and the tank foundation, wherein the first anchor strap includes a first end portion coupled to the inner tank side plate, a second end portion coupled to the tank foundation, a first intermediate portion located between the first end portion and the second end portion and coupled to an inner wall-side portion of the intermediate tank which is exposed to the first inter-tank region, and a second intermediate portion located between the first end portion and the second end portion and coupled to an outer wall-side portion of the intermediate tank which is exposed to the second inter-tank region, the intermediate tank bottom plate includes an annular plate located at a peripheral portion of the intermediate tank bottom plate and a bracket fixed to the annular plate and the intermediate tank side plate at the inner wall-side portion of the intermediate tank;

the first anchor strap includes a first strap body extending from the first end portion coupled to the inner tank side plate to the first intermediate portion coupled to the bracket and a second strap body extending from the second intermediate portion coupled to the outer wall-side portion of the intermediate tank side plate to the second end portion coupled to the tank foundation; and the second anchor strap is integrated with the second strap body or is lined up with the second strap body.

* * * * *